(12) United States Patent
Mela

(10) Patent No.: US 6,980,967 B1
(45) Date of Patent: Dec. 27, 2005

(54) BOUNCEBACK DETECTION IN ONLINE PRODUCT CONFIGURATION

(75) Inventor: John M. Mela, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 09/820,429

(22) Filed: Mar. 28, 2001

(51) Int. Cl.[7] ............................................. G06F 17/60
(52) U.S. Cl. ........................... 705/28; 700/103; 703/1; 703/13
(58) Field of Search .............................. 705/26, 27, 28, 705/29; 700/103; 703/1, 13; 717/107

(56) References Cited

U.S. PATENT DOCUMENTS

| | | | |
|---|---|---|---|
| 5,515,524 A | * 5/1996 | Lynch et al. | 703/13 |
| 5,708,798 A | * 1/1998 | Lynch et al. | 703/1 |
| 5,745,765 A | * 4/1998 | Paseman | 717/107 |
| 5,825,651 A | * 10/1998 | Gupta et al. | 700/103 |
| 5,844,554 A | * 12/1998 | Geller et al. | 345/744 |
| 6,167,383 A | * 12/2000 | Henson | 705/26 |
| 6,405,308 B1 | * 6/2002 | Gupta et al. | 713/1 |

FOREIGN PATENT DOCUMENTS

WO    WO 99/13411    * 3/1999    ........... G06F 17/30

OTHER PUBLICATIONS

Karpinski, Richard; "Configuration Tools Break New Ground—Commerce Interface hook into back-end systems", InternetWeek, Feb. 22, 1999, iss. 753, p. 1.*

* cited by examiner

*Primary Examiner*—James McClellan
*Assistant Examiner*—Marissa Thein

(57) ABSTRACT

The present invention provides techniques for effecting improved guidance to the user of a configuration system by detecting and eliminating bounceback behavior that unnecessarily eliminates otherwise valid domain members from the selection provided to the user. Generally, domain members that would have been eliminated (e.g., grayed out) solely because of bounceback behavior are identified and prevented from being displayed as grayed out or otherwise eliminated on the user display.

10 Claims, 3 Drawing Sheets

BOUNCEBACK DETECTION IN ONLINE PRODUCT CONFIGURATION

FIELD OF THE INVENTION

The invention relates to product configuration, and more particularly to providing improved user guiding behavior by eliminating bounceback behavior during an online product configuration.

BACKGROUND OF THE INVENTION

When configuring a product online, the user is typically presented with a number of components or features that can be selected. These selectable components or features are referred to as variables. For each variable, there are a number of choices. For example, when configuring a personal computer, the user may be asked to select components such as a processor or a disk drive. For each of these components, the user is presented with choices, such as 500 MHz, 600 MHz and 700 MHz for the processor component, and 10 Gbyte, 20 Gbyte, and 30 Gbyte for the disk drive. The set of all choices for a particular variable is referred to as the variable's domain. Each choice in the domain is called a domain member. Thus, in the example above, the processor is a variable having a domain that includes members 500 MHz, 600 MHz and 700 MHz processors. Likewise, the disk drive is a variable having a domain that includes members 10 Gbyte, 20 Gbyte, and 30 Gbyte disk drives. In general, a user can select a domain member for each variable of a configurable product thereby affording the user desirable product flexibility and a positive overall online configuration experience.

During a typical online configuration session, some domain members of one or more variables of the configurable product are not compatible with some domain members of other variables of that same product. For instance, processor speeds of 500 MHz or lower might not be compatible with 30 Gbyte disk drives (for whatever reason). In short, not all of the possible combinations of variables associated with a configurable product are valid. The validity relationships among the variables are expressed as constraints. Constraint-based configuration ensures that only valid choices will prevail in the final configured product. This is accomplished through the process of constraint propagation.

More specifically, as the user enters choices for each variable in turn, the constraints on those choices are propagated throughout the configuration problem associated with that particular configuration session. Variable domain members that are incompatible with user choices currently entered are derived from the propagated constraints, and can be displayed to the user. One way of denoting such incompatibilities is to gray out the incompatible domain members on the user's display window, or to simply remove the incompatible domain members from the user's display window. Thus, selection of the 500 MHz processor might cause the 30 Gbyte disk drive choice to be grayed out on the display, or otherwise eliminated from the available valid choices.

Bounceback Problem

In general, the bounceback problem causes domain members to be unnecessarily removed from the possible choices thereby inhibiting the configuration process. For example, assume that the 500 MHz processor is only compatible with the 10 and 20 Gbyte disk drives, that the 600 MHz processor is only compatible with the 20 Gbyte disk drive, and that the 700 MHz processor is only compatible with the 30 Gbyte disk drive. Given these constraints, selection of the 500 MHz processor causes elimination of the 30 Gbyte disk drive. This result essentially reflects the intended purpose of a configuration system and is not problematic.

However, the 700 MHz processor is only compatible with the 30 GB disk drive. As such, conventional constraint propagation causes elimination of the 700 MHz processor as well. Thus, the 700 MHz processor is also eliminated because the 500 MHz processor was chosen. Stated in terms of the bounceback problem, the 700 MHz process was grayed out by bounceback propagation of constraints caused by the selection of the 500 MHz processor. Note that if the 700 MHz processor were selected, the 500 MHz processor would effectively be deselected and no constraint violation would occur. It can be seen, therefore, that the elimination of the 700 MHz processor due to bounceback behavior inhibits the configuration process thereby adversely affecting the efficiency of a configuration system.

To exacerbate this situation, multiple constraints among several variables form a constraint network of arbitrary complexity for many real world constraint-based configuration problems. Propagation over such a network of constraints may engender bounceback behavior through propagation routes that are much more elaborate and circuitous than the given example above. As such, any one constraint-based configuration problem will generally present a unique set of bounceback behavior challenges. Thus, a bounceback behavior solution must be flexible in its implementation.

There is a need, therefore, for a configuration technique that precludes the elimination of domain members based solely on bounceback behavior. The technique should provide an efficient and flexible process that detects bounceback behavior for an arbitrary network of constraints.

SUMMARY OF THE INVENTION

One embodiment of the present invention provides a method for performing a product configuration, where the product configuration is associated with a configuration problem defining a number of constraints, one or more variables, and domain members associated with each variable. The method includes receiving user input specifying at least one selected domain member, propagating the constraints over the received user input thereby producing a result that identifies incompatibilities between the domain members caused by the at least one selected domain member, and modifying the result by detecting and eliminating incompatibilities caused solely by bounceback behavior.

Another embodiment of the present invention provides a system for performing a product configuration, where the product configuration is associated with a configuration problem defining a number of constraints, one or more variables, and domain members associated with each variable. The system includes a configuration engine adapted to receive user input specifying at least one selected domain member and to propagate the constraints over the received user input thereby producing a result that identifies incompatibilities between the domain members caused by the at least one selected domain member, and a bounceback detection module operatively coupled to the configuration engine, the bounceback detection module adapted to modify the result by detecting and eliminating incompatibilities caused solely by bounceback behavior.

DETAILED DESCRIPTION OF THE INVENTION

Figure 1:
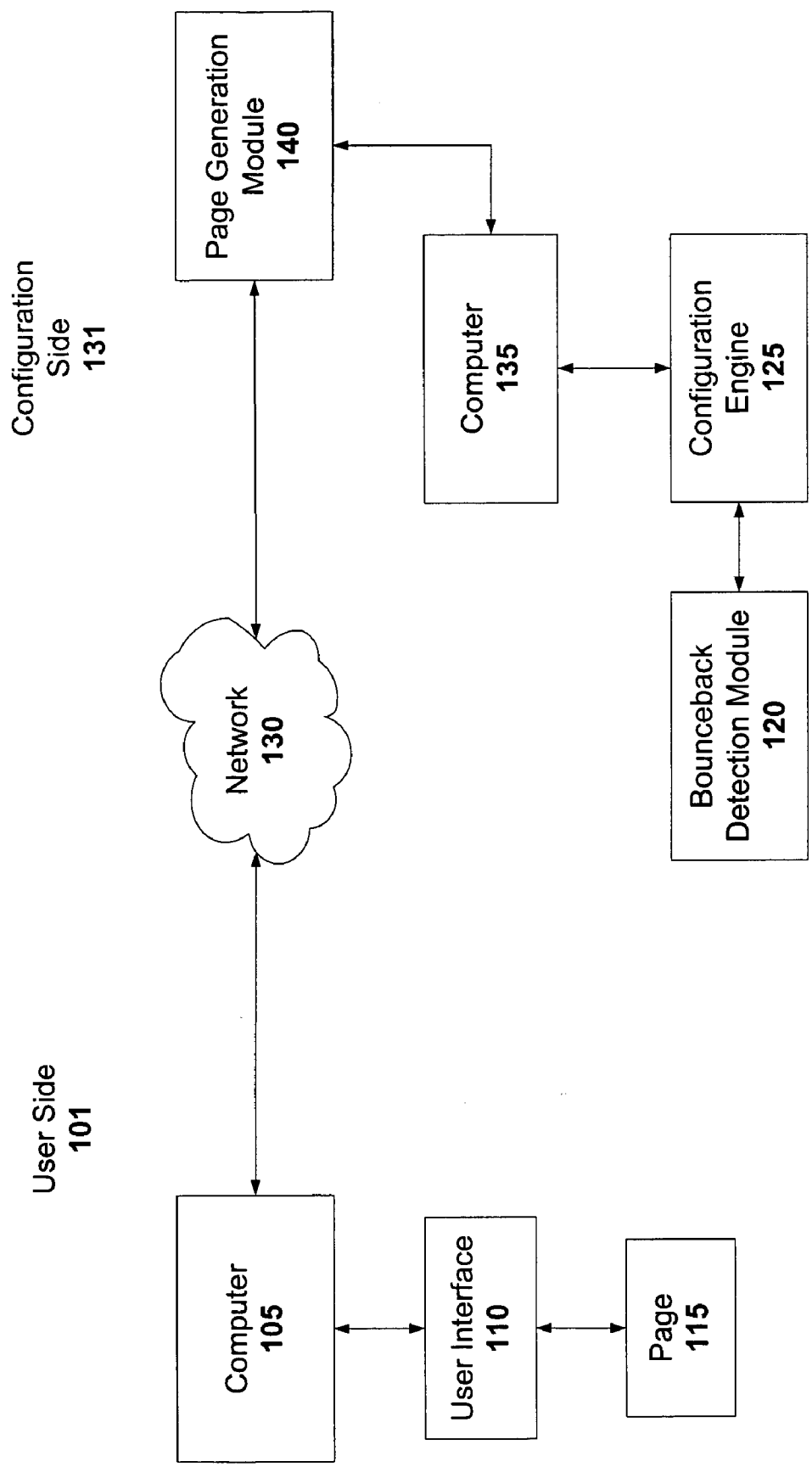
FIG. 1 is a block diagram of a configuration system having bounceback detection in accordance with one embodiment of the present invention.

FIG. 1 is a block diagram of a configuration system having bounceback detection in accordance with one embodiment of the present invention. The system includes a user side 101 and a configuration side 131 coupled together by a network 130. Network 130 can be a local area network (e.g., intra-office network) or a wide area network (e.g., inter-office network or the Internet). Alternatively, network 130 can be a hard link, or any other type of communication path that allows one computer to communicate with another computer (e.g., a wireless communication link).

System Overview

User side 101 includes a computer 105 and a user interface 110. A page 115 is presented to a user via user interface 110. Configuration side 131 includes a computer 135, a page generation module 140, a configuration engine 125, and a bounceback detection module 120. In one embodiment, configuration side 131 can be representative of an Internet-based service provider, such as a virtual computer store that allows a user to configure and purchase a customized computer system online. In such an embodiment, user side 101 might be representative of the purchasing user's home or office computer system that is interacting with configuration side 131 via an Internet connection.

In response to accessing configuration side 131, the user is presented with a configuration page or set of such pages. The user can then select various domain members for each type of variable that is associated with the target product (e.g., a personal computer system). The input provided by the user is then transmitted to configuration side 131 via network 130. Configuration side 131 computes the configuration state based on the cumulative user input. This configuration state specifies various constraints that are associated with the cumulative user input. As a result of the constraints imposed, various domain members are marked as conflicted choices (e.g., grayed out or otherwise eliminated). Note, however, that the user may still be allowed to select such conflicted choices.

When a user selects a domain member marked as a conflicted choice, then a constraint violation results. All the product choices participating in the constraint violation can be marked or otherwise identified accordingly. For example, all product choices participating in the resulting constraint violation can be presented in a red font on the user's display. By showing all product choices that participate in the constraint violation, the user is effectively guided in all the new choices of components. Alternatively, the user could be presented with a violation message explaining the scope of the resulting constraint violation.

In the context of a computer system configuration, for example, assume the following: a 500 MHz processor is only compatible with 10 and 20 Gbyte disk drives, a 600 MHz processor is only compatible with the 20 Gbyte disk drive, and a 700 MHz processor is only compatible with a 30 Gbyte disk drive. Given these constraints, selection of the 500 MHz processor causes elimination of the 30 Gbyte disk drive. Thus, if the user thereafter selects the 30 Gbyte disk drive, the constraint is violated since that selection is not compatible with the selected 500 MHz processor. In such a case, a violation message could be communicated to the user (e.g., presented on the display of the user's computer).

In addition, the user-guiding behavior associated with the present invention further requires that the mere selection of one domain member of a particular variable does not cause the other domain members associated with that variable to be eliminated. For instance, the mere selection of the 500 MHz processor does not cause the other processor choices to be eliminated. The only condition where another processor choice should be eliminated occurs when that processor choice is incompatible with some other set of previously entered user selections. In the example above, there are no other user selections that would eliminate the 700 MHz processor choice. Thus, the user can select the 700 MHz processor instead of the 500 MHz processor. Allowing other members of the processor domain to remain selectable provides the user with guidance in eliminating the constraint violation caused by selection of the 30 Gbyte disk drive. In response to the user selecting the 700 MHz processor, the 500 MHz processor choice is automatically deselected and the constraint violation due to the selection of the 30 Gbyte disk drive is thereby eliminated.

Components

The individual components of the system are shown for instructional purposes. However, one skilled in the art will recognize that some modules or components may actually be integrated or otherwise combined with other components or modules. For example, user interface 110 might be a software application (e.g., browser) running on computer 105. Similarly, page generation module 140, configuration engine 125, and bounceback detection module 120 can all be software programs running on computer 135. Likewise, configuration engine 125 and bounceback detection module 120 can be implemented as a single module that provides equivalent functionality. Other variations will be apparent in light of this disclosure. Note that the user interacting with the system may be, for example, a human or a machine adapted to interact with the system (e.g., another computer system). Further note that a user input may be representative of a single user selection, or a set or accumulation of user selections.

Computer 105 may be any one of a number of conventional computing environments adapted to access network 130. For example, computer 105 might be a home personal computer, an office workstation, a laptop configured with a wireless Internet connection, or an embedded microcontroller. Likewise, computer 105 might be a personal digital assistant or a cell phone that is capable of receiving communications and displaying them to a user so that the user can respond accordingly. In general, computer 105 can be any processing environment that allows for user interaction based on received communications.

User interface 110 allows a user to interact with the system and can be, for example, a browser or graphical user interface that is displayed to a user via a display device (not shown) included on user side 101. Page 115 can be presented to the user by way of user interface 110. Page 115 can include visual communication such as controls (e.g., edit boxes, list boxes, radio button groups and pull down menus), configurable product information, and configuration status information. Recall that each configurable component or feature of a product is a variable having a domain of possible choices. User interface 110 is an effective means for communicating such configuration information in the form of page 115.

On page 115, for instance, the domain of each variable could be displayed to the user as a radio button group or pull down menu included on page 115. Considering the example above, the three processor choices would be shown in the same radio button group, and selecting the 700 MHz processor (e.g., by clicking its associated radio button) causes the radio button next to the 500 MHz processor to become deselected. In general, page 115 can include any type of textual, graphical, or other information that informs the user about the online configuration process. The user can then provide input to the system, for example, by manipulating the configuration controls included on page 115.

Computer 135 of configuration side 131 can be representative of any conventional processing environment. For example, computer 135 may be a server, a workstation, a microcontroller or other suitable processing environment. Page generation module 140 is used to generate pages (e.g., page 115) in response to user input provided from user side 101. The generated pages may be, for example, an entire web page, or a portion of a web page. The generated pages are served or otherwise provided to user side 101 by page generation module 140.

Configuration engine 125 can have the functionality of any one of a number of available configuration engines. One example of a configuration engine is described in U.S. Pat. No. 5,745,765 to Paseman, which is herein incorporated by reference in its entirety. In general, as a user selects various features of a configurable product, configuration engine 125 determines constraints imposed on that product and updates the available product features based on those constraints. In one embodiment, the user is allowed to select conflicted choices thereby causing a constraint violation. The scope of the constraint violation can then be communicated to the user. In this sense, configuration engine 125 prevents invalid configurations and guides the user to a successful final product configuration.

Bounceback detection module 120 eliminates bounceback behavior thereby improving the functionality and user guidance provided by configuration engine 125. Bounceback detection module 120 detects bounceback by identifying, for each eliminated domain member, the user choices whose individual retraction would by itself undo the domain member's elimination. Generally stated, if an eliminated domain member and the user choice that was the sole cause for that domain member's elimination are associated with the same variable, then a bounceback has been identified. An underlying goal of bounceback detection module 120 is to ensure that a domain member identified as being eliminated by bounceback is not grayed out or otherwise eliminated.

In one embodiment, bounceback detection module 120 effects a bounceback detection process that is associated with the following functionality. Each domain member of each variable included in a given configuration problem is associated with a bit vector referred to as a bounceback detection bit vector. Each bounceback detection bit vector consists of one bit for each variable included in the configuration problem. The bounceback detection process maintains the bounceback detection bit vectors during propagation of the given constraints. Bounceback detection bit vectors can be denoted within the process by a bit vector start symbol or identifier (e.g., #) followed by the corresponding binary representation. For example, a bit vector having a length three bits, each bit being a 1, could be denoted by #111.

The first bit of the bit vector is the rightmost bit, and the last bit of the bit vector is the leftmost bit. The variables of the configurable product are given a particular ordering so that each bit position in a bounceback detection bit vector corresponds to a particular variable (e.g., first bit corresponds to first variable, second bit corresponds to second variable, etc.). In general, if in a domain member's bounceback detection bit vector only the bit that corresponds to the variable associated with that domain member is 1 (all other bits are 0), then that domain member is not eliminated. This is because the pending elimination of that domain member is solely due to bounceback.

Note that in this embodiment, the bounceback detection bit vectors are initially set to all 1's. In addition to the bounceback detection bit vectors, a flag (e.g., Boolean flag) is allocated for each domain member of each variable. These flags are also initialized to an initial value (e.g., false), and set (e.g., true) whenever the corresponding bounceback detection bit vector has been set. The flags are used to indicate that the associated domain member is tentatively eliminated thereby facilitating propagation of the given constraints. As such, the flags are referred to as elimination flags. However, note that the corresponding bounceback detection bit vector can be used to effectively reinstate a domain member that was tentatively eliminated because of bounceback. In this sense, a bounceback detection bit vector can trump or override a set elimination flag.

Detailed examples follow that illustrate three basic cases that arise in configuration problems. A first case is generally referred to as a bounceback detection with no conjunctions or disjunctions, a second case is generally referred to as a bounceback detection over a disjunction, and a third case is generally referred to as a bounceback detection over a conjunction. These fundamental cases are essentially the building blocks of all bounceback detection cases. All more complex cases of bounceback detection are combinations of these fundamental cases as will be apparent in light of this disclosure.

Bounceback Detection with No Conjunctions or Disjunctions

In the following example configuration problem, assume a user is configuring a personal computer. The problem variables and their respective domains are a CPU (700 MHz or 900 MHz), a DiskDrive (20 Gbyte or 40 Gbyte), and a Memory (64 Mbyte or 128 Mbyte). The ordering given to the variables is: variable 1=CPU, variable 2=DiskDrive, and variable 3=Memory. As there are three variables in this particular configuration problem, the bounceback detection bit vector associated with each domain member of each variable consists of 3 bits. In addition, assume the following constraints (Kn) are given:

K1: Compatible<CPU, DiskDrive>((700 MHz 20 Gbyte) (900 MHz 40 Gbyte))

K2: Compatible<DiskDrive, Memory>((20 Gbyte 64 MB)(40 GB 128 Mbyte))

K3: Compatible<Memory, CPU>((64 Mbyte 700 MHz) (128 Mbyte 900 MHz))

The first given constraint, K1, states that the 700 MHz CPU is compatible with the 20 Gbyte DiskDrive, and that the 900 MHz CPU is compatible with the 40 Gbyte DiskDrive. It can further be stated that the 700 MHz CPU is not compatible with the 40 Gbyte DiskDrive, and that the 900 MHz CPU is not compatible with the 20 Gbyte DiskDrive. The second given constraint, K2, states that the 20 Gbyte DiskDrive is compatible with the 64 Mbyte Memory, and that 40 Gbyte DiskDrive is compatible with the 128 Mbyte Memory. It can further be stated that the 20 Gbyte DiskDrive is not compatible with the 128 Mbyte Memory, and that 40 Gbyte DiskDrive is not compatible with the 64 Mbyte Memory. The third given constraint, K3, states that the 64 Mbyte Memory is compatible with the 700 MHz CPU, and that the 128 Mbyte Memory is compatible with the 900 MHz CPU. It can further be stated that the that the 64 Mbyte Memory is not compatible with the 900 MHz CPU, and that the 128 Mbyte Memory is not compatible with the 700 MHz CPU. Note that other logical conclusions and transformations may be drawn from the given constraints.

Continuing with the example, assume that the user picks the 700 MHz CPU, and sends the selection to the configuration side (e.g., user selects the 700 MHz CPU radio button and clicks on the submit button). Once the configuration side receives the user pick, the configuration system propagates the constraints associated with that pick. More specifically, the bounceback detection bit vector for the domain members of CPU that were not picked (the 900 MHz CPU) is set to #001, and the elimination flag associated with the 900 MHz is set to true. Setting the bounceback detection bit vector associated with the 900 MHz CPU to #001 indicates that the pick that caused the elimination of the 900 MHz CPU is the pick associated with variable 1, which in this example is the CPU. This is an indication of bounceback behavior. Since the only eliminating variable is the variable of the eliminated domain member, that domain member is not actually eliminated (as indicated by the bounceback detection bit vector) despite the associated elimination flag being set.

Constraint K1 can now be propagated. The 900 MHz CPU domain member behaves as if eliminated, since its elimination flag is true. Thus, the 40 Gbyte DiskDrive is eliminated by K1, which can be interpreted to mean: If the 900 MHz CPU is eliminated, then the 40 GB DiskDrive must be eliminated. The bounceback detection bit vector associated with the 900 MHZ CPU is therefore propagated to the 40 Gbyte DiskDrive (e.g., the bounceback detection bit vector associated with the 900 MHz CPU is copied to the bounceback detection bit vector associated with the 40 Gbyte DiskDrive). As such, the bounceback detection vector for the 40 Gbyte DiskDrive is set to #001. In addition, the elimination flag associated with the 40 Gbyte DiskDrive is set to true. The 40 Gbyte DiskDrive is therefore eliminated. The elimination is confirmed by the bounceback detection bit vector associated with 40 Gbyte DiskDrive because the bit position of that bit vector which corresponds to the DiskDrive variable (the second bit) is not the only 1 bit (in fact, that bit is not set at all).

Next, constraint K2 can be propagated. The 40 Gbyte DiskDrive domain member behaves as if eliminated, since its elimination flag is true. Thus, the 128 Mbyte Memory is eliminated by K2, which can be interpreted to mean: If the 40 Gbyte DiskDrive is eliminated, then the 128 Mbyte Memory must be eliminated. The bounceback detection bit vector associated with the 40 Gbyte DiskDrive is therefore propagated to the 128 Mbyte Memory (e.g., the bounceback detection bit vector associated with the 40 Gbyte DiskDrive is copied to the bounceback detection bit vector associated with the 128 Mbyte Memory). As such, the bounceback detection vector for the 128 Mbyte Memory is set to #001. In addition, the elimination flag associated with the 128 Mbyte Memory is set to true. The 128 Mbyte Memory is therefore eliminated. The elimination is confirmed by the bounceback detection bit vector associated with 128 Mbyte Memory because the bit position of that bit vector which corresponds to the Memory variable (the third bit) is not the only 1 bit (in fact, that bit is not set at all).

Note that the 128 Mbyte Memory is also eliminated by K3, which can be interpreted to mean: If the 900 MHz CPU is eliminated, then the 128 Mbyte Memory must be eliminated. Thus, the bounceback detection bit vector associated with the 900 MHz CPU is propagated to the 128 Mbyte Memory (e.g., the bounceback detection bit vector associated with the 900 MHz CPU is copied to the bounceback detection bit vector associated with the 128 Mbyte Memory). As such, the bounceback detection vector for the 128 Mbyte Memory is set to #001 and the 128 Mbyte Memory is eliminated, thereby producing the same result described with reference to the propagation of K2.

Next, constraint K3 can be propagated. The 128 Mbyte Memory domain member behaves as if eliminated, since its elimination flag is true. Thus, the 900 MHz CPU is eliminated by K3, which can be interpreted to mean: If the 128 Mbyte Memory is eliminated, then the 900 MHz CPU must be eliminated. The bounceback detection bit vector associated with the 128 Mbyte Memory is therefore propagated to the 900 MHz CPU (e.g., the bounceback detection bit vector associated with the 128 Mbyte Memory is copied to the bounceback detection bit vector associated with the 900 MHz CPU). As such, the bounceback detection vector for the 900 MHz CPU is set to #001. In addition, the elimination flag associated with the 900 MHz CPU is set to true. Note, however, that bounceback detection vector for the 900 MHz CPU was already set to #001, and propagation of K3 introduced no changes. Further note the 900 MHz CPU is not actually eliminated (as indicated by the bounceback detection bit vector) despite the associated elimination flag being set) as previously explained.

As can be seen, the 900 MHz CPU would have been eliminated without bounceback detection. Note that this example is representative of a spurious elimination in that the user could have selected the 900 MHz CPU (thereby deselecting the 700 MHz CPU) without violating any constraints.

Bounceback Detection Over a Disjunction

In addition to the three problem variables and respective domains described above, add a fourth: a DiskController (DC1, DC2). In addition, assume a fourth constraint, K4: Compatible<DiskDrive, DiskController>((20 GB DC1)(40 GB DC2)). Since there are now four variables in the problem, the bounceback detection bit vectors will consist of four bits instead of the three as in the previous example. Assume that the user picks the DC1 DiskController in addition to the 700 MHz CPU as indicated above.

Once the configuration side receives the user picks, the configuration system propagates the constraints associated with each pick. The discussion with regards to propagating the constraints associated with the 700 MHz CPU pick generally applies here as will be apparent in light of this disclosure. In addition, the configuration system propagates the constraints associated with the DC1 DiskController. As such, the bounceback detection bit vector for the domain members of DiskController that were not picked (the DC2) is set to #1000, and the elimination flag associated with the DC2 is set to true. Setting the bounceback detection bit vector associated with the DC2 DiskController to #1000 indicates that the pick that caused the elimination of the DC2 DiskController is the pick associated with variable 4, which in this example is the DiskController. This is an indication of bounceback behavior as previously explained.

Constraint K1 can now be propagated as described above with reference to the "Bounceback Detection With No Conjunctions Or Disjunctions" section. Note, however, that the bounceback detection bit vector for the 40 Gbyte DiskDrive is set to #0001 (as opposed to #001) thereby accounting for the fourth variable, the DiskController.

Next, constraint K4 can be propagated. Here, notice that 40 Mbyte DiskDrive is eliminated for two reasons: because of K1 and the fact that the 900 MHz CPU was not chosen, or because of K4 and the fact that the DC2 was not chosen. Thus, a join corresponding to a disjunction can be derived from the given constraints. This join could be stated logically: if either or both of the 700 MHz CPU or the DC1 DiskController are selected, then the 40 Mbyte DiskDrive cannot be selected. To propagate this join, the bounceback detection process logically ANDs the bounceback detection bit vector of the 900 MHz CPU with the bounceback detection bit vector of the DC2 DiskController. More specifically, #0001 is logically ANDed with #1000 thereby producing a bounceback detection bit vector of #0000 for the 40 Mbyte DiskDrive. The 40 Mbyte DiskDrive is therefore eliminated. The elimination flag associated with the 40 Mbyte DiskDrive is also set.

Next, K2 can be propagated as described above with reference to the "Bounceback Detection With No Conjunctions Or Disjunctions" section. Note, however, that the bounceback detection bit vector for the 128 Mbyte Memory is set to #0000 (as opposed to #001) because of the disjunction associated with the elimination of the 40 Mbyte DiskDrive as explained above with reference to the propagation of K4. The bounceback detection bit vector of #0000 associated with the 40 Gbyte DiskDrive is propagated to the 128 Mbyte Memory (e.g., the bounceback detection bit vector associated with the 40 Gbyte DiskDrive is copied to the bounceback detection bit vector associated with the 128 Mbyte Memory). The 128 Mbyte Memory is therefore eliminated.

Next, K3 can be propagated as described above with reference to the "Bounceback Detection With No Conjunctions Or Disjunctions" section. Note, however, that the bounceback detection bit vector for the 900 MHz CPU is set to #0000 (as opposed to #001) because the bounceback detection bit vector of #0000 associated with the 128 Mbyte Memory is propagated to the 900 MHz CPU (e.g., the bounceback detection bit vector associated with the 128 Mbyte Memory is copied to the bounceback detection bit vector associated with the 900 MHz CPU). The 900 MHz CPU is therefore eliminated. This elimination is confirmed by the bounceback detection bit vector associated with 900 MHz CPU because the bit position of that bit vector which corresponds to the CPU variable (the first bit) is not set to 1.

In this case, therefore, the 900 MHz CPU has been appropriately eliminated as a result of subsequent constraint propagation. Consequently, if the user picks the 900 MHz CPU instead of the 700 MHz CPU, a constraint violation would occur because the user has also picked DC1. Similarly, DC2 is also eliminated as a result of subsequent constraint propagation. Note that propagation continues until the bounceback detection bit vectors reach quiescence. As such, bounceback detection bit vectors initially set to indicate bounceback may subsequently be modified to indicate elimination due to reasons other than bounceback.

Bounceback Detection Over a Conjunction

For this case, assume a configuration problem having the following four variables and respective domains: a CPU (700 MHz or 900 MHz), a DiskDrive (20 Gbyte or 30 Gbyte or 40 Gbyte), a DiskController (DC1 or DC2), and a Memory (64 Mbyte or 128 Mbyte). The ordering given to the variables is: variable 1=CPU, variable 2=DiskDrive, variable 3=DiskController, and variable 4=Memory. As there are four variables in this particular configuration problem, the bounceback detection bit vector associated with each domain member of each variable consists of 4 bits. The bounceback detection bit vector could be verbally described (excluding the commas) by: #Memory bit, DiskController bit, DiskDrive bit, CPU bit. In addition, assume the following constraints (Kn) are defined:

K1: Compatible<CPU, DiskDrive>((700 MHz (20 GB 30 GB))(900 MHz (30 GB 40 GB)))
K2: Compatible<DiskController, DiskDrive>((DC1 30 GB)(DC2 (20 GB 40 GB))
K3: Compatible<Memory, DiskDrive>((64 MB 20 GB)(128 MB (30 GB 40 GB)))
K4: Compatible<CPU, Memory>((700 MHz 64 MB)(900 MHz 128 MB))

The first given constraint, K1, states that the 700 MHz CPU is compatible with either the 20 Gbyte DiskDrive or the 30 Gbyte DiskDrive, and that the 900 MHz CPU is compatible with either the 30 Gbyte DiskDrive or the 40 Gbyte DiskDrive. It can further be stated that the 700 MHz CPU is not compatible with the 40 Gbyte DiskDrive, and that the 900 MHz CPU is not compatible with the 20 Gbyte DiskDrive. The second given constraint, K2, states that the DC1 is compatible with the 30 Gbyte DiskDrive, and that DC2 is compatible with either the 20 Gbyte DiskDrive or the 40 Gbyte DiskDrive. It can further be stated that the DC1 is not compatible with either the 20 Gbyte DiskDrive or the 40 Gbyte DiskDrive, and that DC2 is not compatible with the 30 Gbyte DiskDrive. The third given constraint, K3, states that the 64 Mbyte Memory is compatible with the 20 Gbyte DiskDrive, and that the 128 Mbyte Memory is compatible with either the 30 Gbyte DiskDrive or the 40 Gbyte DiskDrive. It can further be stated that the that the 64 Mbyte Memory is not compatible with either the 30 Gbyte DiskDrive or the 40 Gbyte DiskDrive, and that the 128 Mbyte Memory is not compatible with the 20 Gbyte DiskDrive. The fourth given constraint, K4, states that the 64 Mbyte Memory is compatible with the 700 MHz CPU, and that the 128 Mbyte Memory is compatible with the 900 MHz CPU. It can further be stated that the that the 64 Mbyte Memory is not compatible with the 900 MHz CPU, and that the 128 Mbyte Memory is not compatible with the 700 MHz CPU. Other logical conclusions and transformations may be drawn from the given constraints.

Assume that the user has selected the 700 MHz CPU and the DC2 DiskController. Once the configuration side receives the user picks, the configuration system propagates the constraints associated with each pick. As such, the bounceback detection bit vector for the 900 MHz CPU is set to #0001, and the associated elimination flag is set. Likewise, the bounceback detection bit vector for the DC1 DiskController is set to #0100, and the associated elimination flag is set. Next, constraint K1 can be propagated. As a result, the 40 Gbyte DiskDrive is eliminated (because of the 700 MHz CPU selection), and its bounceback detection bit vector is set to #0001, and its associated elimination flag is set. Next, constraint K2 can be propagated. This results in the elimination of the 30 Gbyte DiskDrive (because of the DC2 selection). The bounceback detection bit vector associated with the 30 Gbyte DiskDrive is set to #0100, and the associated elimination flag is also set.

Next, constraint K3 is propagated, with the result that the 128 Mbyte Memory is eliminated. This elimination occurs because both the 30 Gbyte and the 40 Gbyte DiskDrives have been eliminated. Thus, a join corresponding to a conjunction can be derived from the given constraints. This join could be stated logically: if both of the DC2 DiskController and the 700 MHz CPU are selected, then the 128 Mbyte Memory cannot be selected. To propagate this join, the bounceback detection process logically ORs the bounceback detection bit vector for the 30 Gbyte (eliminated by selection of the DC2 DiskController) and 40 Gbyte (eliminated by selection of the 700 MHz CPU) DiskDrives thereby yielding a bounceback detection bit vector of #0101 for the 128 Mbyte Memory. The elimination flag associated with the 128 Mbyte Memory is also set.

Next, constraint K4 is propagated. As the elimination flag associated with the 128 Mbyte Memory is set, the 900 MHz CPU is also tentatively eliminated. The bounceback detection bit vector of the 900 MHz CPU is set to #0101 (since its elimination is necessitated by the elimination of the 128 Mbyte Memory, which has a bounceback detection bit vector is #0101). The elimination flag associated with the 900 MHz CPU is also set. The 900 MHz CPU is not really eliminated, however, because the bit in its bounceback detection bit vector corresponding to its variable (the first bit) is set to 1. Notice that if the user selected the 900 MHz CPU, thereby deselecting the 700 MHz CPU, this would not lead to a constraint violation, and so the 900 MHz CPU is appropriately not eliminated.

The three example cases above illustrate bounceback detection in accordance with one embodiment of the present invention. For each selected variable, the bounceback detection bit vectors of the not selected domain members are initially set to the variable's identifier. Propagation of bounceback detection bit vectors can be accomplished by copying the bounceback detection bit vectors. Propagation of a join corresponding to a conjunction (AND) is achieved by logically ORing the corresponding bounceback detection bit vectors. Propagation of a join corresponding to a disjunction (OR) is achieved by logically ANDing the corresponding bounceback detection bit vectors. Bounceback is detected when a domain member's bounceback detection bit vector has the bit corresponding to the domain member's variable set to 1. Such domain members are not eliminated.

Generally, note that in all cases bounceback detection is indicated when a domain member's bounceback detection bit vector has a 1 bit in the bit position that corresponds to the variable associated with that domain member. The values of the other bit positions for that domain member's bounceback detection bit vector will depend on factors such as the received user selections and the degree to which the given constraints have been propagated.

Figure 2:
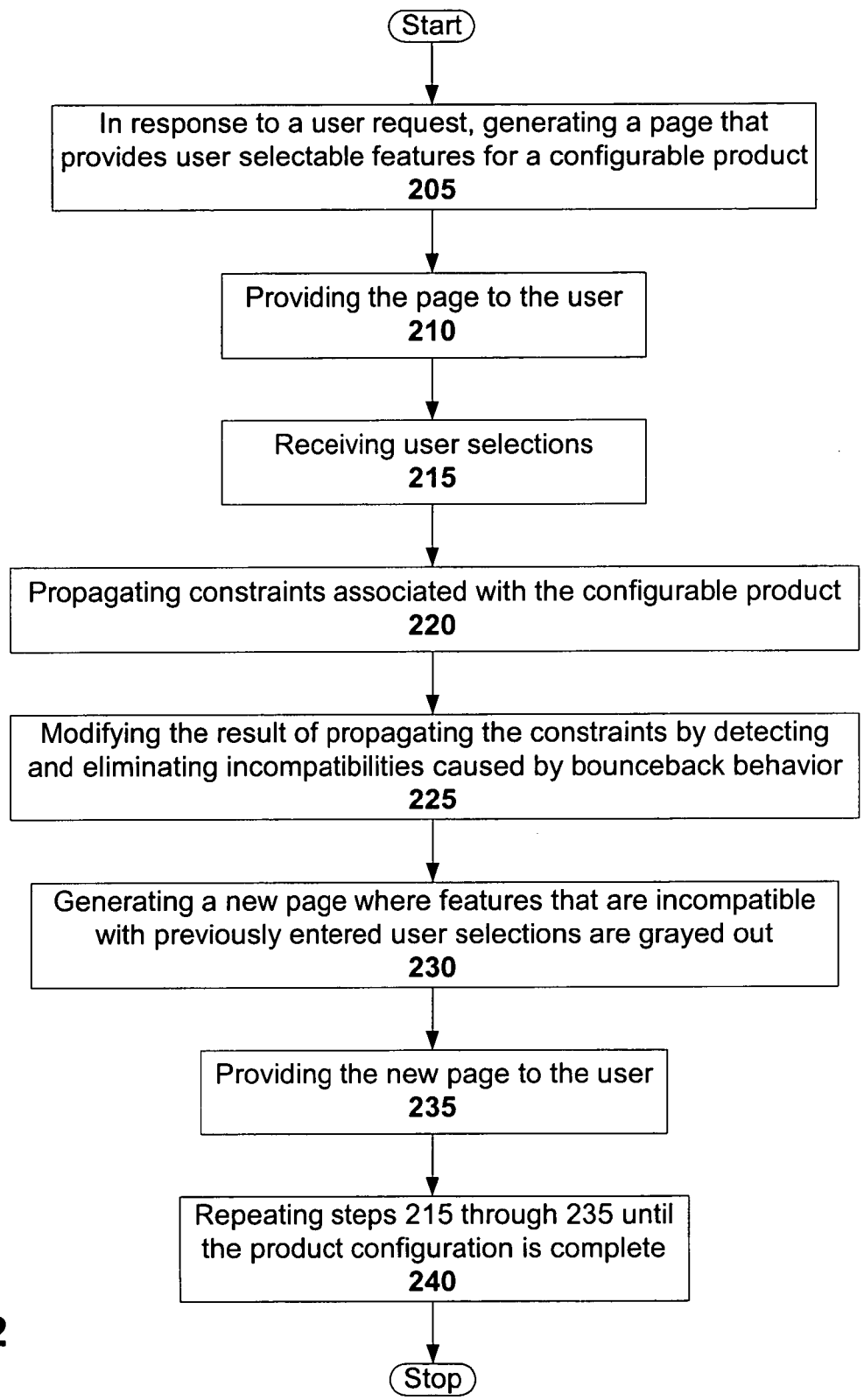
FIG. 2 illustrates a method for detecting and eliminating bounceback behavior associated with a configuration problem in accordance with one embodiment of the present invention.

FIG. 2 illustrates a method for detecting and eliminating bounceback behavior associated with a configuration problem in accordance with one embodiment of the present invention. This method may be implemented, for example, by the system illustrated in FIG. 1. However, other configuration systems may also beneficially employ the method as will be apparent in light of this disclosure. The present invention is not intended to be limited to any one type of configuration system. Assume the configuration problem defines a number of variables, the respective domains of each of those variables, and a number of constraints.

In response to a user request, the method begins with generating 205 a page that provides user selectable features for a configurable product, and providing 210 the page to the user. In the system embodiment shown in FIG. 1, page generation module 140 can be used to carry out steps 205 and 210. Once the user receives the page and provides a number of selections, then the method proceeds with receiving 215 the user selections. The user selections may include a number of selected features where domain members for two or more variables are provided. Alternatively, the user selections may include a single selected feature (a domain member of one variable).

The method further includes propagating 220 the constraints associated with the configurable product over the received user selections. The result of this propagation identifies incompatibilities between various product features given the current configuration state. The current configuration state represents the aggregate of received user selections at any one point in time during the configuration process. In the system embodiment shown in FIG. 1, configuration engine 125 can be used to effect step 220.

The method further continues with modifying 225 the result of propagating the constraints by detecting and eliminating constraints caused by bounceback behavior. In the system embodiment shown in FIG. 1, bounceback detection module 120 can be used to effect step 225. The method may further include generating 230 a new page where the product features identified as incompatible with previously provided user selections are grayed out. Note, however, that product features eliminated solely due to bounceback are not grayed out. The method proceeds with providing 235 the new page to the user, and repeating 240 steps 215 through 235 until the product configuration is complete.

Figure 3:
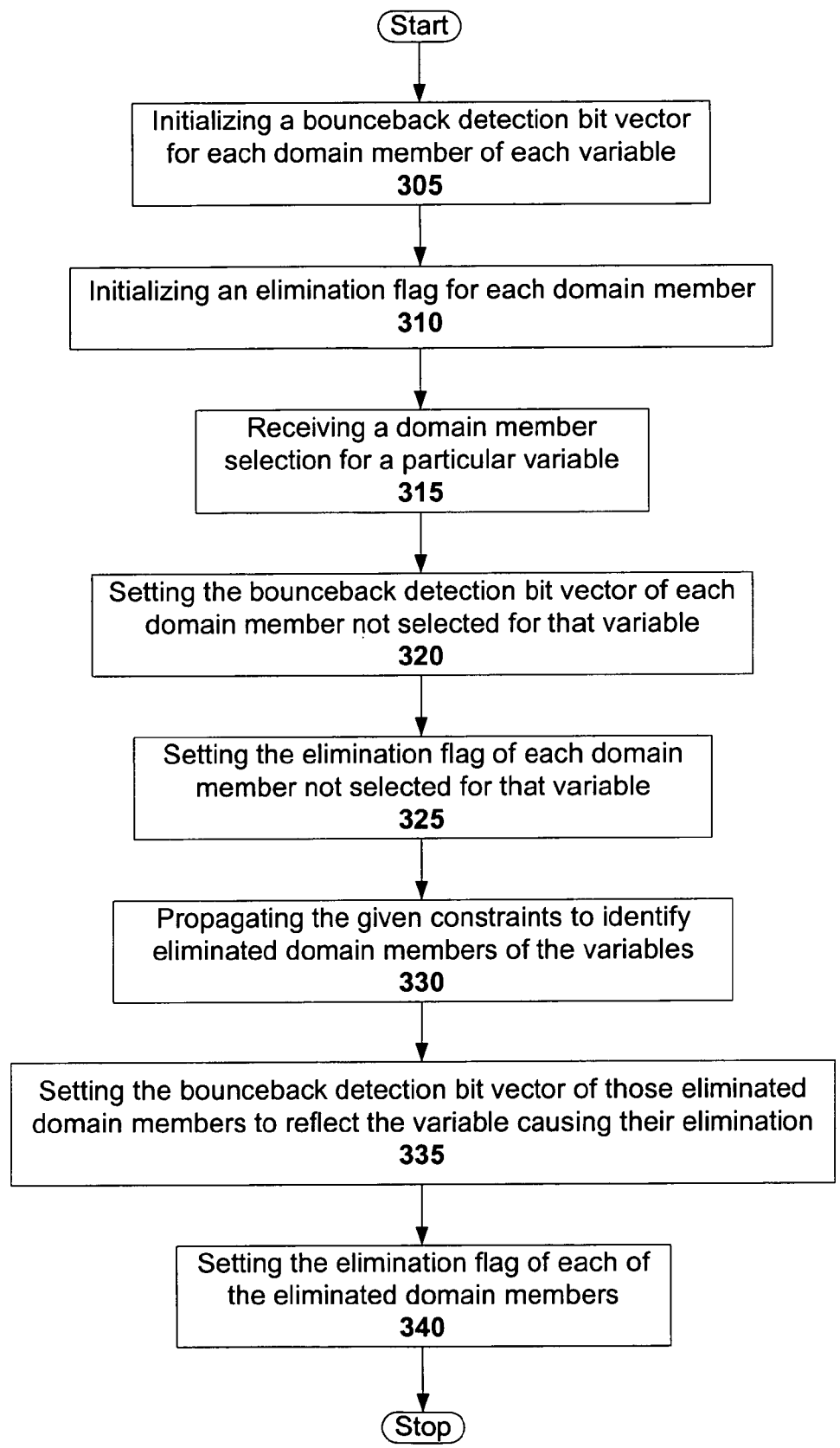
FIG. 3 illustrates a method for detecting and eliminating bounceback behavior associated with a configuration problem in accordance with another embodiment of the present invention.

FIG. 3 illustrates a method for detecting and eliminating bounceback behavior associated with a configuration problem in accordance with another embodiment of the present invention. This method may be implemented, for example, by a module combining the functionality of the bounceback detection module 120 and the configuration engine 125 of the system illustrated in FIG. 1. This combination module may be implemented in hardware, software, firmware or any combination thereof. For example, the described method steps can be carried out by a set of software instructions running on a conventional computer system or server. Assume the configuration problem defines a number of variables, the respective domains of each of those variables, and a number of constraints.

The method begins with initializing 305 a bounceback detection bit vector for each domain member of each variable, and initializing 310 an elimination flag for each domain member. The method further includes receiving 315 a domain member selection for a particular variable. Note that any number of domain member selections for a corresponding number of variables can be received, depending on the user. The following steps can be performed for each domain member selection received. For discussion purposes, however, assume that one domain member selection is received.

For the variable associated with the selected domain member, the method proceeds with setting 320 the bounceback detection bit vector of each non-selected domain member for that variable. Each set bounceback detection bit vector will thereby indicate that the variable associated with the selected domain member is responsible for elimination of the non-selected domain members. This setting can be used, therefore, to indicate that the non-selected domain members were eliminated because of bounceback behavior.

The method further includes setting 325 the elimination flag of each non-selected domain member of the variable associated with the selected domain member. Each of these elimination flags can be used to indicate that its associated domain member is tentatively eliminated thereby facilitating propagation of the given constraints. Recall, however, that the corresponding bounceback detection bit vector can be used to effectively reinstate a domain member that was solely eliminated because of bounceback behavior.

The method further includes propagating 330 the given constraints to identify eliminated domain members of the variables, and setting 335 the bounceback detection bit vector of those eliminated domain members to reflect the variable causing their elimination. In one embodiment, step 335 is achieved by propagating the relevant bounceback detection bit vectors as earlier described in reference to three fundamental cases: bounceback detection with no conjunctions or disjunctions, bounceback detection over a disjunction, and bounceback detection over a conjunction. In short, the bounceback detection bit vector associated with the domain member that is causing the elimination of another domain member is copied or otherwise propagated to the bounceback detection bit vector associated with the domain member being eliminated. Propagation of a join corresponding to a conjunction (AND) is achieved by logically ORing the corresponding bounceback detection bit vectors, while propagation of a join corresponding to a disjunction (OR) is achieved by logically ANDing the corresponding bounceback detection bit vectors. The method further includes setting 340 the elimination flag of each of the eliminated domain members.

Upon completion of the method (for any number of domain selections provided by a user), a new configuration page can then be generated and presented to the user. The product features identified as incompatible with previously provided user selections are grayed out on the new page. Note, however, that product features eliminated solely due to bounceback are not grayed out. The method may be repeated each time the user submits one or more new domain selections.

In an alternative embodiment of the present invention, bounceback detection is performed with a multiple pass approach. More specifically, constraint propagation is performed N+1 times, where N is equal to the number of variables for which user choices have been entered thus far. For each of the individual N variables, domain reductions are computed by propagating all of the user choices except the user choice associated with that individual variable. Thus, N iterations of propagation are performed. Each iteration is referred to as a pass. The aggregate effect of these N passes is that the remaining domain members for each variable are identified. Then, a final pass (the N+1 pass) where all of the user choices are represented is made in order to detect contradictions (e.g., a user choice that is not included in any of the reduced domains).

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for eliminating bounceback behavior while performing a product configuration, the method comprising:
receiving an input specifying a first domain member from a set of available domain members of a first variable;
propagating within a computer-implemented system constraints including
propagating a first constraint over the input thereby eliminating a domain member of a second variable;
propagating a second constraint over the domain member of the second variable thereby marking a second domain member as tentatively eliminated from the set of available domain members of the first variable; and
reinstating the second domain member to the set of available domain members by removing the tentative elimination marking unless
the input further includes specifying a domain member of a variable other than the first variable; and
the second domain member of the first variable is also eliminated by constraint propagation over the domain member of the variable other than the first variable.

2. The method of claim 1 further comprising:
presenting a configuration page showing the set of available domain members of the first variable.

3. The method of claim 2 wherein reinstating the second domain member includes marking the second domain member as a conflicted choice in the configuration page.

4. The method of claim 1 wherein the product configuration is performed across a network.

5. The method of claim 1 further comprising initializing a bounceback detection bit vector for the second domain member of the first variable.

6. The method of claim 5 further comprising initializing an elimination flag for the second domain member of the first variable.

7. The method of claim 5 further comprising setting a bit position of the bounceback detection bit vector, the bit position corresponding to the first variable.

8. A system for performing a product configuration, comprising:
a configuration engine adapted to;
receive an input specifying a first domain member from a set of available domain members of a first variable;
propagate constraints including
propagate a first constraint over the input thereby eliminating a domain member of a second variable;
propagate a second constraint over the domain member of the second variable thereby marking a second domain member as tentatively eliminated from the set of available domain members of the first variable; and
a means for bounceback detection operatively coupled to the configuration engine and adapted to reinstate the second domain member to the set of available domain members by removing the tentative elimination marking unless the input further includes specifying a domain member of a variable other than the first variable and the second domain member of the first variable is also eliminated by constraint propagation over the domain member of the variable other than the first variable.

9. The system of claim 8, further comprising:
a page generation module operatively coupled to the configuration engine and adapted to generate a configuration page including the set of available domain members of the first variable, and provide the configuration page to a computer.

10. The system of claim 8 wherein the page generation module is further adapted to mark the second domain member as a conflicted choice in the configuration page after the second domain member has been reinstated by the bounceback detection module means.

* * * * *